Patented June 9, 1925.

UNITED STATES PATENT OFFICE.

CHARLES HOFFMAN, OF TUCKAHOE, HARRY DAVETT GRIGSBY, OF BROOKLYN, AND NATHAN MINTON CREGOR, OF NEW YORK, N. Y., ASSIGNORS TO WARD BAKING COMPANY, OF NEW YORK, N. Y., A CORPORATION OF NEW YORK.

FOOD PRODUCT.

No Drawing.   Application filed October 1, 1921. Serial No. 504,693.

*To all whom it may concern:*

Be it known that we, CHARLES HOFFMAN, HARRY DAVETT GRIGSBY, and NATHAN MINTON CREGOR, all citizens of the United States, and residing, respectively, at No. 132 Bella Vista Avenue, Tuckahoe, New York; No. 105 Quincy Street, Brooklyn, New York; and No. 26 West 83rd Street, New York city, have invented certain new and useful Improvements in Food Products; and we do hereby declare the following to be a full, clear, and exact description of the invention, such as will enable others skilled in the art to which is appertains to make and use the same.

This invention relates primarily to the manufacture of a food product rich in vitamines and available for widely extended use in the hygienic, domestic and commercial arts and industries having to do with alimentation and nutrition.

In its preferred form, the product consists of a sugar material, high in soluble sugars, protein and mineral salts, which material serves as a carrier for a rich content of vitamines associated with it. A particular merit of the manufacture is that the material may be produced from cheap by-products such as rice polishings, or wheat bran, and to especial advantage from the germs of cereals, for instance, (1) wheat germs, which like wheat bran, are a by-product of the manufacture of wheat flour, and, (2) maize germs which are a by-product of the manufacture of various products, (such as hominy, "corn" flours and "corn" meal) from so-called "Indian corn" or maize.

In the polishing of rice, the germ and branny material is removed during the polishing operation and is collected as a brownish product which is known as rice polishings. It is high in mineral salts, fairly high in protein and contains a large amount of water-soluble B vitamines.

In the manufacture of wheat flours by the roller process of milling, there is formed, in addition to the branny material constituting the main body of the by-product, a separate or additional by-product containing the germ of the wheat and known commercially as "wheat germ". It contains usually from 5 to 40 per cent of bran and about 10 per cent of fine particles of flour, the remainder being the pure germ. The percentage of bran present in this commercial "wheat germ" varies with the prevailing practice in individual mills, some mills producing a germ almost free from bran and others producing a germ containing varying quantities of bran up to about 40 per cent as above noted.

In the manufacture of hominy, corn flour and corn meal from Indian corn or maize, there results a by-product consisting mainly of the pure "corn" germ or maize germ.

The cereal germs, and particularly the wheat germ and maize germ, are high in mineral salts and protein and rich in water-soluble B vitamines. Like rice polishings, they are by-products obtainable in large quantity and at a low price. By means of the present invention, they are utilized to obtain a material of very considerable commercial value not only because of its sugar and protein content, but also because its richness in water-soluble B vitamines makes it available to supplement the supply thereof in food products deficient in those elements.

For instance, as more fully set forth in Letters Patent No. 1,431,525, granted Oct. 10, 1922, on an application filed of even date herewith, the product of the present invention may be utilized in the bread making industry, not only contributing sugar protein and mineral salts to the finished loaf, but giving it a rich-water-soluble B vitamine content. So also, it may be used as an ingredient of many of the so-called "breakfast foods". That is to say, such products as corn flakes and other cereal flakes, shredded wheat and the like. Furthermore, being highly albuminous it can be used to advantage in the manufacture of cake, inasmuch as it will "cream up" well in such manufacture. Moreover, being of itself a pleasantly flavored palatable and highly nutritious material, it may be used per se for its food value or in admixture with other foods, as for instance, in making up so-called "malted" foods or other foods for infants by stirring it into milk, or the like, or by incorporating it as an ingredient of food for invalids or convalescents where it is important that the food shall be especially rich in water-soluble B vitamines.

It may also be used generally in the manufacture of candies, as, for instance, so-called "milk chocolates," and, in fact, in confectionery in general, and in the manufacture of ice cream. It may, before concentration, or after partial concentration be sprayed into flour, or the concentrated and dried product may be diluted and sprayed into flour. Indeed, the product of the invention is utilizable generally wherever it is useful or desirable to add a material high in vitamines to an article of food.

In the practice of the invention, the raw materials (i. e., the rice polishings, wheat germs, maize germs, or the like, either alone or in admixture) are first freed from their vegetable fat by an extraction process, a suitable extracting agent for the purpose being benzol or carbon tetrachloride, each of which is available economically because of its low cost, efficiency, and ready regeneration. Any other suitable extracting agent may be employed, although either of the ones above specified, and particularly benzol, are preferred for the reasons given, and also because both of these solvents serve to extract practically all of the coloring matter from the raw material, and thus produce an ultimate product of lighter color. Crushed or ground roasted peanuts, or the like, high in protein, may be incorporated in the batch if desired and are likewise freed from their oil in the extracting operation.

After regeneration of the solvent, the extracted oil may be utilized in the manufacture of soap, or otherwise, either with or without preliminary hydrogenation. The extraction of the oil is found, in most instances, to be accompanied with the extraction of certain bitter or acrid substances present in the raw material and which, unless thus removed, would be correspondingly objectionable in the ultimate product.

The preliminary removal of the oil, although useful, is of lesser importance where it is small in amount, or where the toxic, bitter or acrid substances are of lesser importance, as, for instance, in rice polishings. Nevertheless, even in such cases the removal of the oil is desirable, and is preferred, particularly for the reason that even though present in a moderate amount it interferes with the malting operation hereinafter described, and also with filtering, which, as will be hereinafter noted, enters into the manufacture.

After the extraction of the oil, the raw material or materials employed are cooked with say five to ten times their weight of water so as to thoroughly gelatinize the starch contained in them.

The cooked mixture is then cooled down to about one hundred degrees Fahrenheit and an infusion of barley malt is then added. The infusion of barley malt used to malt the cooked mixture is obtained from a batch of from five to thirty (preferably ten) per cent by weight of malt—calculated upon the solids present in the cooked mixture of the raw materials from which the oil has been extracted. The amount of malt infusion added should be sufficient to supply enough diastase to ultimately effect solution of the starches present and their conversion into sugar (maltose and dextrins).

About an hour after adding the malt infusion (so as to afford ample time for the malt to act upon the starch and protein of the batch), the digestive ferments, papain, trypsin, pancreatin, and pepsin are added (either singly or mixed) in amount sufficient to ultimately bring into solution, by the proteolytic enzymes present, a large proportion of the proteins in the batch. Usually from one to four pounds of the ferment will suffice to one thousand pounds of the total solids used.

The temperature of the mixture of cooked raw material, malt infusion, and ferment is then maintained at 100°–120° Fahrenheit for from one to two hours to effect solution by the proteolytic enzymes of a large proportion of the proteins in the batch. The temperature is then raised to 154° Fahrenheit for from say fifteen to twenty minutes, to permit completion of the solution of the starches by the diastase of the malt. Then the temperature is raised slowly, during a period of say fifteen minutes, up to 170° Fahrenheit, and then more rapidly to the boiling point to destroy all of the enzymes. The action of the papain upon the proteins continues notably to near the boiling point, whereas the action of the other ferments (particularly pepsin), is weaker, and is less prolonged as the temperature rises. The wheat germ is naturally acid and this acidity likewise exists in the extract and is favorable thereto. If, in any instance, the extract, after malting and after the action of the ferments, does not show acidity, it is preferable to add sufficient acid thereto to give a distinct acid reaction just before filtration, and consequently, before concentration, both of which actions are facilitated by the presence of a small quantity of acid in the extract.

The digestion above described is best accomplished in a beer mash-tun or similar apparatus provided with suitable stirrers and with a suitable steam-heating jacket or other appropriate heating means.

After digestion, the liquid is tapped from the bottom, and is thus strained clear by the insoluble residue acting as a filter; or it is filtered clear by a filter press, or by any other suitable apparatus or method. The residue is finally washed free of soluble material, and the washings thus obtained are added to the initial clear extract and together with it are concentrated in a vacuum evaporating apparatus and finally brought to dryness in a vacuum drum drier or other drying device capable of drying the product without discoloring it by the heat applied.

In the case of rice polishings, the ultimate product is a light yellow crystalline material quickly soluble in water to a clear solution. It has the following approximate analysis; 5% mineral salts, soluble protein 8%, the remainder being largely carbohydrates (maltose and dextrins). This product also contains all of the water-soluble B vitamines of the original rice polishings used as the starting material.

When "corn" germ (i. e., maise germ) is used as the starting material, the approximate formula of the product is as follows: 5% mineral salts, 18% to 20% soluble protein, and 75% to 77% made up largely of soluble carbohydrates (maltose and dextrins), together with the water-soluble B vitamines present in the the original corn germ starting material.

When wheat germ is used as the starting material, the approximate formula of the resulting product is about 5% to 6% mineral salts, 28% soluble protein, and 66% to 67% made up largely of soluble carbohydrates (maltose and dextrins), together with the water-soluble B vitamines contained in the original wheat germ starting material. The amount of vitamine present in this product is about twice as much as the vitamine present in dry brewer's yeast.

If the use of the digestive ferments is dispensed with, in the process, the amount of soluble protein will be somewhat diminished in each of the instances above specified, but the sugar content will be correspondingly higher.

In some instances, other raw materials, high in protein, such as alfalfa, may be incorporated in the batch, as, for instance, by chopping up the alfalfa and mixing it with the rice polishings or the cereal germs, or the like. In view of the small amount of sugar obtainable from alfalfa, however, it is desirable to limit the quantity employed in making up the batch, although the proportion of vitamines present in alfalfa is sufficient to contribute very materially to the vitamine content of the final product.

Instead of saccharifying the extract of the raw material by malting it, as hereinbefore described, the saccharification may be effected by means of a suitable acid, organic or inorganic, as, for instance, hydrochloric acid, sulfuric acid, phosphoric acid, citric acid, tartaric acid, or the like; in which case, the sugars present in the final product will consist in large part of glucose and dextrins. The final product will, of course, likewise contain a large proportion of soluble proteins and mineral salts. Prior to the addition of the acids it will be desirable to subject the material to the action of the ferments, that is to say, the acid (for instance, one quarter of 1% hydrochloric acid on the weight of the liquid) is to be added preferably to the liquid obtained after the cooked material has been subjected to the action of the ferments.

In some instances, the ferments (particularly, trypsin and pancreatin) may be used alone in the manufacture, that is to say, without resorting to a preliminary malting operation; these ferments having a sufficient diastatic action to suffice for the conversion of the starch in the raw material. This is particularly feasible where pancreatin is used as the ferment. Where trypsin is used it will be advisable to employ a somewhat larger quantity than would otherwise be necessary to obtain the same result.

It will be particularly noted that when the digestive ferment employed in the manufacture of the product is papain, the yield is materially increased; for instance, by the combined use of the malting operation and the use of papain as the digestive ferment, it is feasible to obtain from the wheat germ a yield of about 70% of the final product (the sugary material) whereas, under similar circumstances, when pepsin, or trypsin or pancreatin is used as the ferment the yield is less,—usually not more than 60%.

When the final product is to be used in the manufacture of leavened bread of high vitamine content, it will be desirable to omit, in the process of making the sugary material, the feature of introducing the ferments. The reason for this omission is more fully described in the copending application hereinbefore referred to, but may be briefly stated to be that it is only feasible to incorporate in the ordinary commercial loaf of leavened bread a certain amount of soluble portein in the form in which it appears in the sugary material constituting the final product of the present invention, i. e., soluble protein in the form of peptones, peptides, aminoacids, etc., which, if present in too large an amount give a more or less undesirable flavor to the bread, and also impart to the crust of the baked loaf too dark a color instead of the golden bloom desirable; consequently, a product as high in soluble proteins of the kind referred to as that obtained when the ferments are employed, (and particularly when papain is employed as the ferment) can be introduced into the dough in an amount more limited than is desirable from the standpoint of increasing the water-soluble B vitamine content of the finished loaf. That is to say, when the sugary material produced with the aid of the ferments is employed in the manufacture of leavened bread, it is so high in these soluble proteins that a lesser amount suffices to give the finished loaf sufficient sugar to flavor the loaf and to impart to the loaf a notable bloom, and, consequently this lesser proportion likewise cuts down the amount of water-soluble B vitamines added to the loaf; whereas, when the digestive ferments are not employed in the manufacture of the sugary material, a larger amount of the sugary material may be incorporated in the dough batch, and, consequently, a larger proportion of water-soluble B vitamines may be added to the loaf. It will be understood, therefore, that the present invention contemplates the production of the sugary material, as herein described, whether the digestive ferments are, or are not, employed. As hereinbefore indicated, the sugary material may be and preferably is concentrated to dryness. For convenience of storage, transportation and sale, concentration to dryness (that is to say, to the dryness of ordinary sugar) is preferred. Nevertheless, in some cases, particularly where the material is to be promptly used and is not subjected to deteriorating influences, it will be feasible to concentrate it merely to the form of a syrup, or even to a lesser degree where the conditions determining its subsequent use are favorable.

It is even feasible, though usually to less advantage, to obtain a product containing all of the water-soluble B vitamines of the original raw materials herein specified, and with a notable sugar content by subjecting the raw materials (either with or without the preliminary step of extracting the oil therefrom) to extraction by water or by alcohol, and subsequently concentrating the liquor thus obtained. For instance, wheat germs, after dissolving out the oil therefrom may be extracted by agitating the germ with water at a temperature of about 140° Fahrenheit for a period of three hours, a yield of sugary material of from 40% to 45% being obtained, which material will contain the water-soluble B vitamines present in the original stock treated. So also, by extracting wheat germs, (from which the oil has first been dissolved out) by a mixture of equal parts of water and ethyl alcohol, by volume, a yield of 25% is obtained containing the water-soluble B vitamines of the original material. These yields, although less in amount represent, nevertheless, commercial results available for the uses and purposes of this invention; inasmuch as they put at the disposition of the user a sugary material high in water-soluble B vitamines and in mineral salts and rich in protein. While we prefer to cook the raw materials and to saccharify and digest them as hereinbefore described, it will be understood, therefore, that we regard our invention as sufficiently broad to cover the water extraction and alcohol extraction as noted.

What we claim is:

1. The method of producing a food product rich in water-soluble B vitamines from such raw materials as rice polishings, wheat bran, cereal germs, and the like, which comprises cooking the raw materials until the starch present is gelatinized, and saccharifying the gelatinized starch; substantially as described.

2. The method of producing a food product rich in water-soluble B vitamines from such raw materials as rice polishings, wheat bran, cereal germs, and the like, which comprises cooking the raw materials until the starch present is gelatinized, and saccharifying the gelatinized starch by the action of malt diastase thereon; substantially as described.

3. The method of producing a food product rich in water-soluble B vitamines from such raw materials as rice polishings, wheat bran, cereal germs, and the like, which comprises cooking the raw materials until the starch present is gelatinized, saccharifying the gelatinized strach, and bringing into solution the proteins present; substantially as described.

4. The method of producing a food product rich in water-soluble B vitamines from such raw materials as rice polishings, wheat bran, cereal germs, and the like, which comprises cooking the raw materials until the starch present is gelatinized, saccharifying the gelatinized starch, and bringing into solution the proteins present by the action of a digestive ferment thereon; substantially as described.

5. The method of producing a food product rich in water-soluble B vitamines from such raw materials as rice polishings, wheat bran, cereal germs, and the like, which comprises cooking the raw materials until the starch present is gelatinized, saccharifying the gelatinized starch, and bringing into solution the proteins present by the action of papain thereon; substantially as described.

6. The method of producing a food product rich in water-soluble B vitamines from such raw materials as rice polishings, wheat bran, cereal germs, and the like, which comprises cooking the raw materials until the starch present is gelatinized, saccharifying the gelatinized starch by the action of malt diastase and subjecting the mass to the action of a digestive ferment; substantially as described.

7. The method of producing a food product rich in water-soluble B vitamines from such raw materials as rice polishings, wheat bran, cereal germs, and the like, which comprises cooking the raw materials until the starch present is gelatinized, saccharifying the gelatinized starch by the action of malt diastase and subjecting the mass to the action of papain; substantially as described.

8. The method of producing a food product rich in water-soluble B vitamines from such raw materials as rice polishings, wheat bran, cereal gems, and the like, which comprises cooking the raw materials until the starch present is gelatinized, saccharifying the gelatinized starch, and bringing into solution the proteins present by the action of a digestive ferment thereon, and destroying the enzymes remaining after the digestive ferment has performed its solvent function; substantially as described.

9. The method of producing a food product rich in water-soluble B vitamines from such raw materials as rice polishings, wheat bran, cereal germs, and the like, which comprises cooking the raw materials until the starch present is gelatinized, saccharifying the gelatinized starch, and bringing into solutions the proteins present by the action of a digestive ferment thereon and destroying, by a boiling operation, the enzymes remaining after the digestive ferment has performed its solvent function; substantially as described.

10. The method of producing a food product rich in water-soluble B vitamines from such raw materials as rice polishings, cereal germs, and the like, which comprises cooking the materials until the starch present is gelatinized, saccharifying the gelatinized starch, and concentrating the resulting sugary liquor; substantially as described.

11. The method of producing a food product rich in water-soluble B vitamines from such raw materials as rice polishings, cereal germs, and the like, which comprises cooking the materials until the starch present is gelatinized, saccharifying the gelatinized starch by the action of malt diastase thereon, and concentrating the resulting sugary liquor, substantially as described.

12. The method of producing a food product rich in water-soluble B vitamines from such raw materials as rice polishings, cereal germs, and the like, which comprises cooking the materials until the starch present is gelatinized, saccharifying the gelatinized starch, bringing into solution the proteins present, and concentrating the resulting sugary liquor; substantially as described.

13. The method of producing a food product rich in water-soluble B vitamines from such raw materials as rice polishings, cereal germs, and the like, which comprises cooking the materials until the starch present is gelatinized, saccharifying the gelatinized starch, bringing into solution the proteins present by the action of a digestive ferment thereon, destroying the enzymes remaining after the digestive ferment has performed its solvent function, and concentrating the resulting sugary liquor; substantially as described.

14. The method of producing a food product rich in water-soluble B vitamines from wheat germ, which comprises extracting the oil from the germ, then cooking the germ to gelatinize the starch present, saccharifying the gelatinized starch, and concentrating the resulting sugary liquor; substantially as described.

15. The method of producing a food product rich in water-soluble B vitamines from wheat germ, which comprises extracting the oil from the germ, then cooking the germ to gelatinize the starch present, saccharifying the gelatinized starch by the action of malt diastase thereon, bringing the proteins present into solution by the action of papain thereon, destroying the enzymes remaining after the papain has exercised its solvent function, and concentrating the resulting sugary liquor; substantially as described.

In testimony whereof we affix our signatures.

CHARLES HOFFMAN.
HARRY DAVETT GRIGSBY.
NATHAN MINTON CREGOR.